United States Patent [19]

Kissel et al.

[11] Patent Number: 4,466,809
[45] Date of Patent: Aug. 21, 1984

[54] FUEL SUPPLY METHOD FOR A GASIFICATION CHAMBER

[75] Inventors: Rolande Kissel, Le Vesinet; Pierre Berger, Saint-Etienne; Gérard Chrysostome, Montchanin, all of France

[73] Assignee: Creusot-Loire, Paris, France

[21] Appl. No.: 374,217

[22] Filed: May 3, 1982

[30] Foreign Application Priority Data

May 8, 1981 [FR] France ............... 81 09244

[51] Int. Cl.³ ............................. C10J 3/46
[52] U.S. Cl. ......................... 48/197 R; 48/206;
  241/260.1; 241/261; 414/197; 414/218
[58] Field of Search ......... 48/197 R, 202, 206,
  48/210; 44/13; 425/376 R; 264/176 R;
  414/190, 197, 218; 366/321; 241/260.1, 261

[56] References Cited

U.S. PATENT DOCUMENTS

| | | | |
|---|---|---|---|
| 2,184,248 | 12/1939 | Bonotto | 414/218 |
| 2,560,807 | 7/1951 | Lobo | 48/DIG. 7 |
| 2,735,787 | 2/1956 | Eastman et al. | 48/DIG. 7 |
| 3,035,306 | 5/1962 | Rossiter | 264/176 R |
| 4,088,528 | 5/1978 | Berger et al. | 241/260.1 |
| 4,284,247 | 8/1981 | Eriksson | 241/261 |
| 4,302,353 | 11/1981 | Escher et al. | 48/197 R |

*Primary Examiner*—Peter F. Kratz
*Attorney, Agent, or Firm*—Pollock, Vande Sande & Priddy

[57] ABSTRACT

Method for supplying fuel material to a gasification reactor into which a mixture of finely powdered fuel material, in suspension in a liquid phase, is charged inside a pressurized combustion chamber into which the combustion-supporting gas is injected and constituting the reactor, by means of a screw conveyor producing a continuously fluid-tight plug by compression of the driven material. By intermeshing at least two overlapping screws with identical threads rotated in the same direction, a wringing of the mixture introduced through an input orifice is compressed by regulating the flow rate of the mixture supply and the rotary speed of the screws so that, for a given flow rate of material, the plug constituted in a braking zone is at a given pressure and contains a certain proportion of liquid phase. The additional amount of liquid phase is expelled into the braking zone and reascends upstream into a drive zone where it is removed through orifices formed in filtering parts of a sleeve.

5 Claims, 8 Drawing Figures

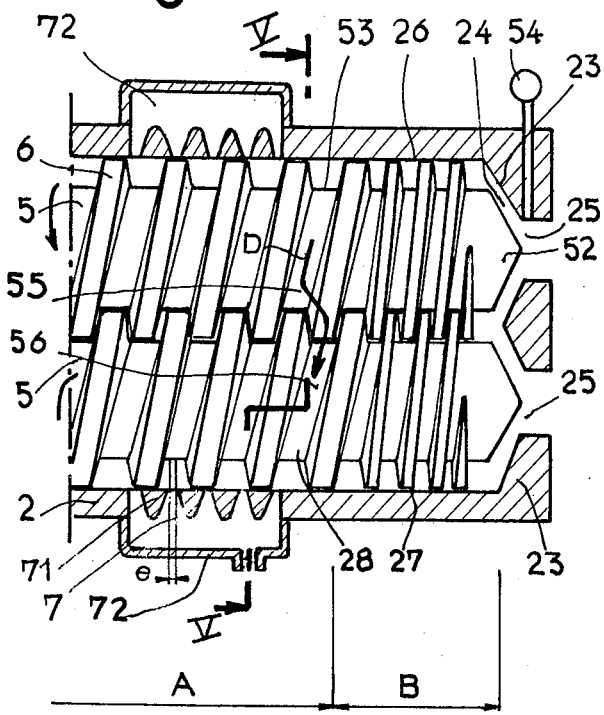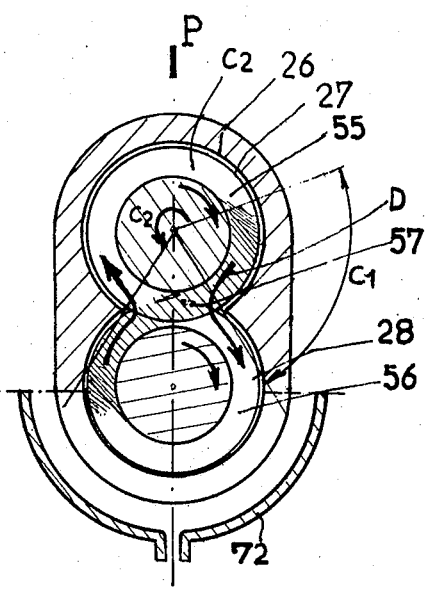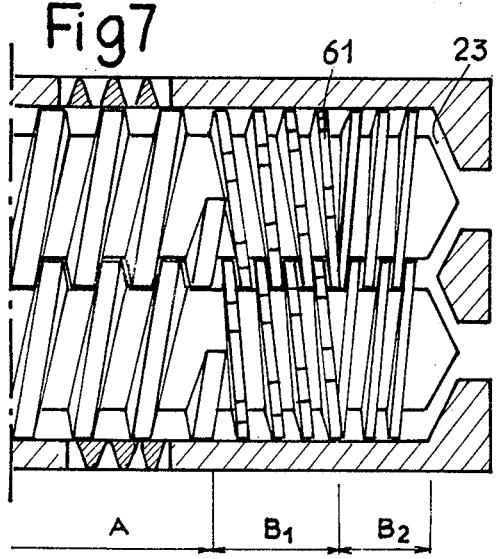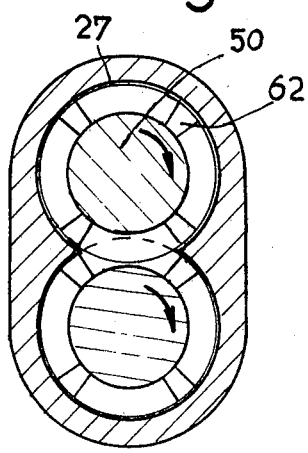

FUEL SUPPLY METHOD FOR A GASIFICATION CHAMBER

FIELD OF THE INVENTION

The invention relates to a method and an apparatus for supplying fuel to a pressurized combustion chamber.

BACKGROUND

Gasification reactors are known which are constituted in principle by a combustion chamber into which is injected a combustion supporting gas, generally oxygen, which burns a coal-based fuel mixture. In this type of method, for various reasons, the enclosure is often kept at a considerable pressure, for example of the order of 10 to 80 bars.

The coal must be finely powdered and in a known method, to convey it and inject it into the reactor, it is suspended in a liquid, generally water. In this way a pumpable mixture is obtained, but the pumps customarily used normally require a high content of liquid, higher than 40%, which does not improve the thermal efficiency of the reaction. It is true that the latter must not proceed at too high a temperature and that it is necessary in any case, in controlling this temperature, to use water as a moderator. However, the water content necessary for the gasification reaction to function well does not exceed 15%. It is therefore of interest to attempt to reduce the water content of the fuel mixture thus introduced into the reactor.

Another problem arises from the pressure existing in the combustion chamber and the need to maintain fluid-tightness therein during the introduction of the fuel. This result can be achieved when a pump is used enabling the mixture to be introduced into the vessel at the desired pressure. However, as has just been stated, a pump can only operate with a fairly high water content.

To introduce a drier mixture, it is also possible to use to piston system but such a system has the drawback of operating discontinuously.

It has also been proposed to use a screw conveyor which enables the production, by extrusion at the entrance into the combustion chamber, of a compressed plug of material sufficiently fluid-tight at the pressure of the chamber and which is renewed continuously progressively with its introduction. In known installations, this device comprises a screw rotated within a sleeve provided with an entrance for the mixture at an upstream end, and an exit opening into the pressurized vessel at a downstream end. The mixture introduced at the entrance of the sleeve is driven by the rotation of the screw to its downstream end provided with a convergent section followed by a die which retards the material to oblige the latter to be compressed so as to form, in the die, a compact plug introduced into the combustion chamber constituting the gasification reactor and continuously rewewed by the material arriving from upstream.

Such a device enables the introduction into the vessel of the reactor, while maintaining fluid-tightness, of a mixture having a water content below that needed for pumping by conventional means. However, in practice, this water content must be higher than 20% and preferably of the order of 40% for a powdered material.

On the other hand, in the supply methods used to date the fuel mixture received at the entrance of the reactor generally has a fairly high water content.

In fact, to bring the fuel from the place of production or the unloading port to the place of utilization, situated sometimes at a considerable distance, it is advantageous to use a "carboduc" in which the previously powdered coal is carried in a water suspension. The water content is then very high, of the order of 90%.

It is also possible to receive the coal separately and to subject it to dry grinding. However, if it is desired to avoid too large a production of dust, the dry grinding cannot be very thorough and must be following by wet grinding.

By way of example, there is shown in attached FIG. 1 a prior art feed installation.

In this figure, there is shown diagrammatically the gasification reactor constituted by the pressurized vessel 1 at the upper part of which is located a burner 2 into which at 21 the fuel mixture is introduced, the oxygen being injected at 22.

The fuel mixture constituted by solid coal arriving at 3 is mixed, after possible dry grinding at 31, with the water arriving at 32. The mixture is introduced into a wet grinder 4 in which the grinding must be fairly thorough in order that the material emerging at 21 should not contain particles larger than the limit allowed for gasification; in practice, this limit is of the order of 0.5 millimeter.

To be introduced into the burner 2, the wet mixture emerging at 41 from the grinder passes first into a homogenization device 43 into which it is injected at 41 by a pump 44.

Even when a screw introduction device is used, the supply diagram is similar and, in particular, it is necessary to carry out very thorough grinding which, of course, increases the energy consumption of the installation.

SUMMARY OF THE INVENTION

It is an object of the invention to provide a method and apparatus for supply of fuel, enabling both reduction in the water content of the mixture injected into the reactor, simplification of the grinding process.

In the method according to the invention, due to the use, for driving and compressing the material, of the meshing action of at least two overlapping screws with identical threads rotated in the same direction, there is produced in the compression zone a wringing of the mixture introduced through the entrance orifice by regulating the feed delivery rate of the mixture and the speed of rotation of the screws so that, for a given delivery rate of material at the exit of the sleeve, the plug constituted in the braking zone is at a given pressure and contains a certain proportion of liquid phase, the additional amount of liquid phase being expelled from the braking zone and reascending upstream into the drive zone where it is removed through orifices formed in the filtering parts of the sleeve.

According to a first embodiment, the wet grinding carried out before the introduction of the mixture into the reactor is adjusted so that the presence in the mixture emerging from the grinder of a certain proportion of coarse particles of granulometry larger than that necessitated for the operation of the reactor is tolerated, a certain amount of liquid is added to this mixture and it is passed into a sorting device in liquid phase comprising both an output of coarse particles, which are recycled to the input of the wet grinder for regrinding, and an output of fine mixture, and this mixture, containing a proportion of liquid higher than 40%, is introduced into the entrance orifice of the charging device with several screws, wherein a wringing of the material is carried out until the formation of a compact plug having a predetermined liquid content, preferably less than 15%, and the excess liquid collected at the exit from the filtering parts of the sleeve is recycled and mixed in part with a material emerging from the wet grinder to give the latter the liquid content necessary for the operation of the sorting device.

In another embodiment in which the grinding is carried out also while tolerating the presence at the exit of the grinder of a certain amount of coarse particles, a complementary grinding is effected inside the introduction device with several screws effecting at the same time the formation of the fluid-tight plug and the wringing of the material.

To carry out this complementary grinding, the screws comprise, in the compression zone, threads having a pitch reversed with respect to that of the downstream driving zone, and the latter are provided with openings formed radially over the height of the thread and of a width such that they retain the particles of excessive size until the latter have reached a sufficient degree of grinding and enabling passage downstream of the particles sufficiently ground to be introduced into the reactor.

In another embodiment, the mixture, which arrives from a coal pipe, is introduced directly at the exit of the carboduc into the input orifice of the charging device where the wringing of the mixture is carried out and the formation of the plug at the selected water content and the screw charging device at the same time effects complementary grinding of the fuel material.

BRIEF DESCRIPTION OF THE DRAWINGS

The accompanying figures show by way of example several embodiments of installations for practising the method according to the invention.

FIG. 5 is a partial side view, in axial section, of the downstream end of the introduction (or charging) device.

FIG. 6 is a cross-section along the line VI—VI of FIG. 5.

FIG. 7 is a side view in axial section of the downstream end of a charging device according to another embodiment of the invention.

FIG. 8 is a cross-sectional view along the line VIII—VIII of FIG. 7.

DETAILED DESCRIPTION OF PREFERRED EMBODIMENTS

Figure 1:
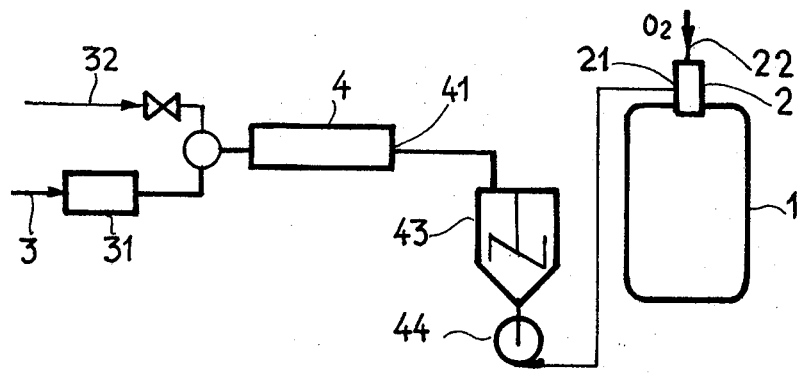
FIG. 1 shows diagramatically a prior art installation for supplying a gasification reactor.
Figure 2:
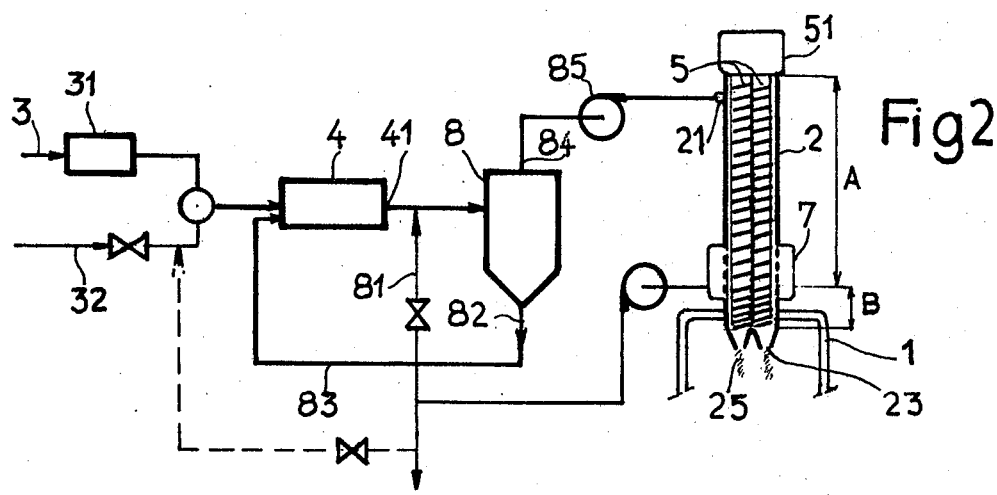
FIGS. 2, 3 and 4 show, respectively, three embodiments of a supply installation according to the invention.

If, the prior art arrangement of FIG. 1 is compared with the installation according to the invention, shown in FIG. 2, it will be noted that the latter also comprises the pressurized vessel 1 of the gasification reactor into which is introduced a fuel mixture constituted by coal introduced at 3 and water introduced at 32, the mixture passing into a wet grinder 4.

According to an essential feature of the invention, the device 2 for charging the mixture comprises two parallel screws 5 with identical overlapping threads, rotated in the same direction by a driving device 51.

The device is shown in more detail in FIGS. 5 and 6, FIG. 5 being a section of the downstream end, passing through the axes of the two screws 5.

The screws are rotated in the direction which, according to the pitch of the thread 6, enables the material introduced through an entrance orifice 21 to be driven to the downstream end. At this downstream end, the sleeve 2 is provided, preferably, with a convergent section 23 in the axis of each screw, each convergent section 23 being constituted by a concave conical surface into which a conical tip 52 of the screw enters, separated from the surface 23 by a narrow space 24 allowing the material to pass to the outlet orifice 25.

The passage of the material driven by the engagement of the screws into the two convergent sections 23 and into the orifices 25 effects a braking of the material which is compressed between the threads 6, the shaft 53 of the screw and the inner wall 26 of the sleeve.

Thus along the screws are distinguished, from upstream to downstream, a driving zone A and a compression zone B in which, if necessary, the threads of the screws can have a closer pitch to increase the compression effect.

The use, according to the invention, of a machine with at least two screws driven in the same direction for the charging of the material, has important advantages in this particular application to a gasification reactor.

In fact, in a one-screw extruder, the fluid-tight plug is formed in a channel which follows the screw and which forms a die. By modifying the diameter and the length of this channel, it is possible to regulate both the feed delivery rate, relative to the rotary speed of the screw, and the intensity of friction and consequently the braking effect which enables the fluid-tight plug to be produced. All the material introduced into the screw must re-emerge through the downstream end, and the liquid phase therefore remains inside the plug the compactness and the fluid-tightness of which it increases.

The fluid-tightness cannot be obtained positively at the top of the screws, since, if the compression ratio in the threads increases too much, the liquid phase has a tendency to escape and to pass between the periphery of the threads and the inner wall of the sleeve, thus forming along the latter a skin which would tend to eliminate the friction between the inner wall of the sleeve and the material driven by the screws. Now, the progress of the material downstream is precisely due to the friction which prevents the material from rotating with the screw. If a film of water is formed between the material and the sleeve, the material then rotates with the screw and no longer advances downstream. The advancing process of the material is completely different in a machine with two screws driven in the same direction, as has been shown in FIGS. 5 and 6. In fact, in this case, if the material is moved axially, it is particularly in the driving zone where the threads are not completely filled. In fact, a certain portion of the solid material is driven by the rotation of the thread and rotates around the shaft to the median zone 57 where the threads mesh with one another. The material can then pass into the following thread by following the path of the bent arrow D but, due to the fact of the reduction in cross-section caused by engagement of the threads, it is compressed inside the thread 55, upstream of the zone 57 in the direction of rotation of the screw, before passing into the neighboring thread 56 of the other screw. The same process develops on the other side of the plane P passing through the axes of the screws.

Due to the fact that the material is driven by being compressed towards the zone C on each side of the plane P, the zone 57 of engagement of the screws is always filled with material.

In addition, progressively with the advance downstream, the material is compressed and a greater proportion of particles is rotated around the screws outside of the threads. The angular sector C1 corresponding to the compressed zone of each thread increases, while the sector C2 corresponding to the remaining zone of the thread 55 in which the material is less compressed, dimishes.

On arriving at the downstream end, in the compression zone B, the threads are completely filled with compressed solid material which rotates around the screws in passing from one to the other, forming a helical path with two periodic changes in direction. As a result there is excellent homogenization of the mixture which exerts equal pressure over the whole inner wall of the sleeve in the compressed zone B. Fluid-tightness can therefore be assured not only in the convergent sections 23 and the dies 25 but also, inside the threads, in the zone B wherein the interstice 27 existing necessarily between the periphery 60 of the thread and the inner wall 26 of the sleeve is filled with compressed material.

On the other hand, inside each thread, before the latter are completely filled with solid material, the compression of the mixture in the sector C1 of the thread causes expulsion of at least a portion of the liquid phase towards the relaxed zone corresponding to the sector C2 of the same thread. For each of the screws, the angular sectors C2, even if their aperture dimishes going downstream, are placed on the same side of the plane P and therefore communicate through the interstice 27 between the periphery of the screw and the sleeve.

If at least a portion of the expelled liquid phase is allowed to escape to the outside of the sleeve, a liquid phase stream could therefore be established along the sleeve in the interstices 27, such stream reascending upstream to the zone where it can escape. Thus, the interstices 27 will play a filtering role in allowing the water to pass upstream and in retaining the solid particles driven downstream.

To this end, the wall 2 of the sleeve is provided, upstream of the compression zone B and consequently at the end of the drive zone A, with filtering parts provided with orifices allowing the water to pass and retaining the solid particles.

These filtering parts 7 could be constituted, over a certain sectors of the walls of the sleeve 2, by curved bars 71 with a V-shaped cross-section, parallel to one another and arranged transversely to the axes of the screws 5, their edges being slightly spaced by a distance (e) such that the solid particles are retained inside the sleeve while the liquid phase can escape to an enclosure 72 wherein the filtered liquid phase is collected and which can be evacuated either by gravity or by means of a suction pump.

By means of this arrangement, there is produced, inside the charging device, a wringing of the material simultaneously with a formation of a fluid-tight plug at the downstream end. In addition, this plug is formed not only in the outlet orifice 25 but also inside the threads of the compression zone B.

However, another advantage of the use of a charging device with two screws driven in the same direction resides in the fact that such a device enables the reactor to be supplied with a mixture the water content of which can be controlled and maintained permanantly at a value fixed in advance.

In fact, it has been observed that a relationship exists between the water content of the mixture and the pressure which is produced in the convergent section 23 and in the outlet orifice 25 of each screw. Consequently, depending on the discharge rate of material to be produced at the outlet 25 of the device, it is possible to regulate as a function of one another the mixture supply delivery rate to the input orifice 21 and the rotary speed of the screws so as to maintain the pressure inside the convergent section at a constant value, thereby enabling the water content of the plug which escapes through the orifice 25 to be kept substantially constant. To this end, the pressure in the orifice 25 or in the convergent section 24 is measured by a pressure gauge 54 and consequently the supply delivery rate to the input orifice 21 and the rotary speed of the screws is regulated either manually or by a regulating system so as to keep the measured pressure constant.

Prior tests enable the determination, as a function of the output delivery rate, of the relationship between the measured pressure and the water content of the plug.

Of course, the water content can also be regulated by modifying the delivery rate sucked into the chamber 7.

Thus, the use of a charging device with several screws having filtering zones provides a means for regulating the water content of the material charged into the reactor at a selected level, regardless of the proportion of liquid existing in the mixture received at the input orifice 21 of the device.

As a result of this feature, the general supply principle of the reactor 1 can be modified advantageously.

In the embodiment of FIG. 2, the usual arrangement is slightly modified at the entrance for the materials inasmuch as water and coal are received separately and are mixed and introduced into wet grinder 4, enabling the granulometry of the coal to be reduced until the particles are of sufficient fineness to be introduced into the gasification reactor.

In the prior art method, considering that it is desired in general to limit the water content of the mixture, simple means are not available to effect sorting of the coarse particles, as this can be done easily only on a very dilute suspension. For this reason, the grinding must be more thorough necessitating an increase in the size of the grinder and the energy consumed so as to be sure that at the outlet 41 of the grinder there no longer exists any particle over the desired dimension, i.e., generally, 0.5 mm.

By means of the invention, on the contrary, it is possible to carry out coarser grinding and to tolerate at the output 41 of the grinder the presence in the mixture of a certain amount of particles above the selected limit, e.g., particles above 2 or even 5 mm.

The mixture emerging from the grinder is then led into a device for sorting by water 8, for example, of the hydrocyclone type.

This device only operates well with a high content of water, and in any case above 60%. This is why, if the ground mixture emerging at 41 from the grinder 4 is not sufficiently dilute, water is introduced into the mixture before the entrance into the hydro-cyclone 8 which therefore includes an outlet 82 for the coarse elements which are recycled at 83 at the entrance of the grinder 4 to undergo regrinding and an exit 84 through which is removed a mixture which is very wet but containing only particles having the desired granulometry; this very wet mixture is easily pumped by a pump 85 for supplying of the charging device 2. The latter performs, as previously described, a wringing of the wet mixture so that the material introduced into the vessel 1 through the orifices 25 contains the desired proportion of water, possibly less than 15%. The excess water is collected in filtering vessel 7 whence it is pumped and recycled through the circuit 81, in part into 86, before entering the hydro-cyclone 8 and in part at 87 before entering the grinder 4. The flow rates of water in the circuits 32, 86 and 87 are adjusted according to requirements and a purge 88 is also provided in the circuit 81.

The principle of the installation which has just been described therefore permits coarser grinding to be tolerated and, consequently, the use of a simpler grinder consuming less energy. However, the dual-screw device used, according to the invention, for charging material may also, in case of need, carry out a certain grinding of the solid particles.

In fact, the path previously described, of the solid particles inside each thread, with alternation of phases of compression and of relaxation, with a change in direction on passage from one screw to the other causes excellent mixing of the particles, particularly in each engagement zone C. This mixing, to which the compression effect is added, could already produce a certain grinding of the material, but it is possible in addition to increase the intensity thereof by means of the arrangement shown in FIGS. 7 and 8. It is possible, in fact, after the driving zone A to place in the screws a zone B1 in which the threads have a pitch reversed with respect to that of the threads of the zone A causing the downstream drive. These threads, which obviously rotate in the same direction, have a tendency to cause the return rearwards of the material and have consequently a braking effect which increases the compression of the material at the end of the driving zone A.

To enable passage downstream of the material with a controlled flow rate, the threads 61 of the zone B1 are provided with openings or "windows" 62 formed radially over the height of the thread between the shaft 50 of the screw and the periphery 60 of the thread 61. These windows are distributed regularly around the shaft, and preferably are off-set angularly from one thread to the next so as to facilitate the establishment of a flow of material permitted to pass downstream.

It is possible to give the windows 62 a width enabling the dimension of the particles permitted to pass downstream to be checked, the coarsest particles remaining upstream in the highly compressed zone where they undergo grinding, particularly on passage of the engagement zone C.

Thus, in the zone with the reversed pitch D1 there is produced a sorting effect of the fuel material which undergoes in this zone and upstream of the latter complementary grinding to the desired degree.

Downstream of the zone D1, the screws can be provided again with zones D2 with a direct pitch causing advance of the material to the convergent areas 23.

However, a very high compression ratio of the material producing a fluid-tight plug has already been obtained in the zone D1 and at the end of the zone A. Consequently, it is also possible to eliminate the zone D2 and the convergent zones 23 by allowing the material to enter directly the vessel 1 of the reactor. The use of the convergent element 23 facilitates, however, the measurement of the pressure by pressure gauge 54 to check the maintenance of the latter at a sufficient value above the pressure existing in the reactor and, on the other hand, as has been indicated previously, to check the water content of the mixture introduced into the reactor.

This possibility of carrying out complementary grinding of the solid particles within the charging device itself, simultaneously with the formation of the fluid-tight plug, enables further simplification of the flow diagram of the installation.

Figure 3:
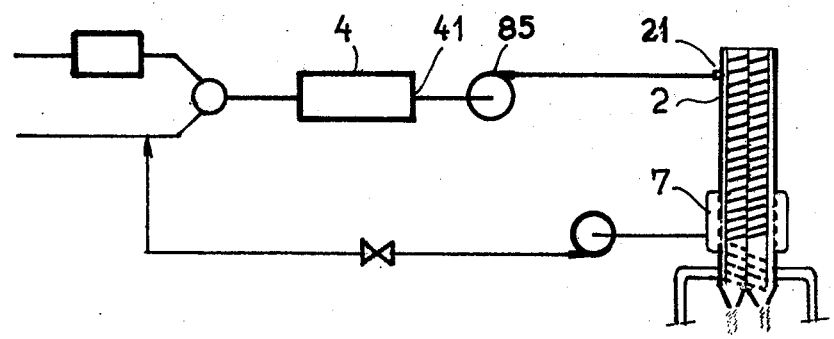

FIG. 3 shows, by way of example, a somewhat simplified installation.

As in the preceding case, described with reference to FIG. 2, grinding which is not intense is carried out in a grinder 4 at the output of which a certain proportion of particles of relatively large dimensions, for example, over 2 mm, is tolerated. The mixture emerging at outlet 41 of the grinder 4 is pumped to be introduced at the entrance orifice 21 of the charging device 2 in which, as has just been indicated, not only draining of the material to the desired water content is effected simultaneously with the formation of the fluid-tight plug, but also complementary grinding of the solid particles to a degree of fineness controlled by the window 62.

The excess water removed through the filtering chamber 7 can serve for the formation of the suspension introduced into the grinder 4 in the case where the latter is fed separately with water and with a dry fuel material.

Figure 4:
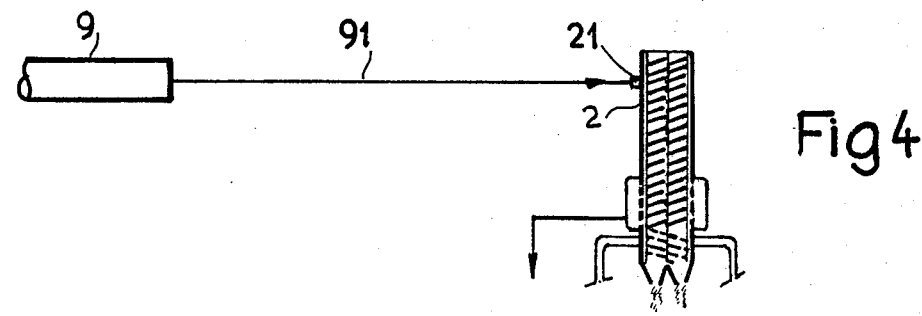

However, in numerous cases, the fuel mixture arrives in the form of an extremely dilute suspension, for example, up to a moisture level of 90%, in a carboduc. The invention then enables the use of an extremely simplified principle of operation, which has been shown in FIG. 4.

In this case, the carboduc 9 can open directly into a supply circuit 91 of the charging device 2. The latter therefore receives a very dilute mixture, for example at 90%, but produces draining to the desired water content, the excess water being removed through the filtering chamber 7. In addition, the coal led into the carboduc is generally finely powdered, and the granulometry can be comprised between 0 and 2 mm. As previously indicated, it is possible to carry out directly in the charging device 2 a complementary grinding of the coal to the desired water content.

According to another feature of the invention, the draining carried out in the course of the introduction of the material into the pressurized vessel also gives the very important advantage of enabling the use in the gasification reactor of solid fuels of any type, such as coals, lignite, peat or even those deriving from biomass, etc.

In fact, as has been indicated, to obtain an advantageous yield of the gasification reactor, it is preferable for the fuel material introduced into the latter to have a fairly limited water content, preferably less than 15%. Now, for the determination of this water content, only the fuel portion of the solid material introduced must be taken into account. Consequently, if the solid material contains a certain proportion of incombustible ash or of water bound chemically to the combustible portion, as in the case of lignites or of biomass, the ratio of the proportion of useful fuel material to water is further reduced.

By means of the invention, by reducing by wringing the proportion of liquid phase contained in the material introduced into the reactor, it is possible to adjust the latter according to the useful amount of fuel material and consequently to obtain an adequate water content, taking into account the amount of ash and the amount of chemically bound water.

In particular, in the case where the fuel material which it is desired to gasify is a lignite, account can be taken of the chemical water content of lignites so as to leave in the material introduced into the reactor only a minimum amount of liquid phase, enabling overall the obtaining of the optimal water content just sufficient for the latter to perform its role of moderator of the reaction.

We claim:

1. Method of supplying particulate solid fuel material to a pressurized combustion-gasification chamber by means of a screw conveyor comprising at least two screws rotatably driven at the interior of a sleeve debouching at its downstream end into said chamber, said material being charged into said sleeve at its upstream end and being moved by said screws toward said downstream end, said material passing into a compression zone located at said downstream end so as to form a fluid-tight plug of compressed material introduced into said chamber and continuously renewed by material arriving from upstream, characterized in that said material is first mixed outside of said screw conveyor with a liquid phase constituting a moderator combustion fluid so as to form a mixture containing at least 40% by weight of liquid phase, said mixture then being charged by pumping into the inlet of said screw conveyor, said screws having different threading defining a drive zone in the downstream direction and a compression zone in which said fluid-tight plug is formed by expulsion of said liquid phase and compression of said combustible material, the flow rate of feeding said mixture and the speed of rotation of said screws being mutually adjusted in such manner as to maintain at the outlet of said screw conveyor a substantially constant pressure corresponding to a substantially constant proportion of liquid phase of at most 15%, any excess of said liquid phase beyond said proportion being expelled upstream and evacuated by filtering parts arranged in said sleeve upstream of said compression zone.

2. Method according to claim 1, wherein said mixture is passed through a wet grinder prior to its charging into said screw conveyor for wet grinding sufficiently light to allow the subsistence within the mixture of particles larger than 2 mm, supplemental grinding being effected inside said screw conveyor during the formation of said fluid-tight plug, to the point where said plug contains no particle larger than 0.5 mm.

3. Process according to claim 2, wherein said fluid-tight plug and said supplemental grinding are effected by passing said mixture into said compression zone of said screw conveyor, the latter having threads of reversed pitches provided with windows enabling selective passage downstream of said material after sufficient grinding.

4. Process according to claim 2, wherein, after wet grinding, said mixture is passed into a hydrocyclone allowing retention of large particles which are then recycled upstream of said wet grinder for further wet grinding.

5. Process according to claim 1, wherein said mixture is charged in suspended form from the outlet of a coal pipe directly to the inlet of said screw conveyor, where there is effected wringing of said mixture and formation of a plug having a water content lower than a preselected limit for proper operation of said reactor, supplemental grinding of said fuel material being performed simultaneously with said charging.

* * * * *